US010427093B2

(12) United States Patent
Hirata et al.

(10) Patent No.: US 10,427,093 B2
(45) Date of Patent: Oct. 1, 2019

(54) $CO_2$ RECOVERY APPARATUS AND $CO_2$ RECOVERY PROCESS (71) Applicant: MITSUBISHI HEAVY INDUSTRIES, LTD., Tokyo (JP)

(72) Inventors: Takuya Hirata, Tokyo (JP); Hiroshi Tanaka, Tokyo (JP); Hiromitsu Nagayasu, Tokyo (JP); Yoshiki Sorimachi, Tokyo (JP); Daisuke Shimada, Tokyo (JP); Tsuyoshi Oishi, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 561 days.

(21) Appl. No.: 15/100,124

(22) PCT Filed: Jan. 9, 2015

(86) PCT No.: PCT/JP2015/050550
§ 371 (c)(1),
(2) Date: May 27, 2016

(87) PCT Pub. No.: WO2015/111454
PCT Pub. Date: Jul. 30, 2015

(65) Prior Publication Data
US 2017/0106332 A1 Apr. 20, 2017

(30) Foreign Application Priority Data

Jan. 24, 2014 (JP) .................. 2014-011562

(51) Int. Cl.
*B01D 53/14* (2006.01)
*B01D 53/34* (2006.01)
(Continued)

(52) U.S. Cl.
CPC ..... *B01D 53/1475* (2013.01); *B01D 53/1412* (2013.01); *B01D 53/346* (2013.01);
(Continued)

(58) Field of Classification Search
CPC .. B01D 2252/20478; B01D 2258/0283; B01D 53/1412; B01D 53/1475;
(Continued)

(56) References Cited

U.S. PATENT DOCUMENTS 2,549,952 A 4/1951 Wheelock
4,106,916 A * 8/1978 Tuckett .................. B01D 53/14
196/132

(Continued)

FOREIGN PATENT DOCUMENTS

JP 3212524 B2 9/2001
JP 2011-000528 A 1/2011
(Continued)

OTHER PUBLICATIONS

Translation of Written Opinion dated Mar. 31, 2015, issued in counterpart International Application No. PCT/JP2015/050550. (5 pages).
(Continued)

*Primary Examiner* — Cabrena Holecek
(74) *Attorney, Agent, or Firm* — Westerman, Hattori, Daniels & Adrian, LLP (57) ABSTRACT

A $CO_2$ recovery apparatus is provided with: a $CO_2$ absorption tower for bringing exhaust gas into contact with a $CO_2$ absorbing liquid and making the $CO_2$ absorbing liquid absorb the $CO_2$ contained in the exhaust gas; a $CO_2$ absorbing liquid regeneration tower for heating the $CO_2$ absorbing liquid with steam and releasing $CO_2$ from the $CO_2$ absorbing liquid and regenerating the $CO_2$ absorbing liquid; a flowmeter for determining the flow rates of the exhaust gas
(Continued)

introduced into the $CO_2$ absorption tower; and a control unit for classifying the flow rates of the exhaust gas into multiple flow rate ranges, and controlling the flow rate of the $CO_2$ absorbing liquid supplied to the $CO_2$ absorption tower and the flow rate of steam supplied to the $CO_2$ absorbing liquid regeneration tower on the basis of prescribed set load values which have been previously established in accordance with the multiple flow rate ranges.

3 Claims, 6 Drawing Sheets

(51) Int. Cl.
  B01D 53/62 (2006.01)
  C01B 32/50 (2017.01)
(52) U.S. Cl.
  CPC .............. B01D 53/62 (2013.01); C01B 32/50 (2017.08); *B01D 2252/20478* (2013.01); *B01D 2258/0283* (2013.01); *Y02C 10/06* (2013.01); *Y02P 20/152* (2015.11)
(58) Field of Classification Search
  CPC ...... B01D 53/346; B01D 53/62; C01B 32/50; Y02C 10/06; Y02P 20/152
  See application file for complete search history.

(56) References Cited

U.S. PATENT DOCUMENTS

| | | |
|---|---|---|
| 4,198,388 A | 4/1980 | Laslo et al. |
| 4,772,298 A | 9/1988 | Stewart |
| 2010/0319531 A1 | 12/2010 | Iijima et al. |
| 2014/0373720 A1* | 12/2014 | Nakagawa ......... B01D 53/1412 96/234 |

FOREIGN PATENT DOCUMENTS

| | | |
|---|---|---|
| JP | 2011-177684 A | 9/2011 |
| WO | 2013/114488 A1 | 8/2013 |

OTHER PUBLICATIONS

Internal Search Report dated Mar. 31, 2015, issued in counterpart International Application No. PCT/JP2015/050550 (2 pages).
Written Opinion dated Mar. 31, 2015, issued in counterpart International Application No. PCT/JP2015/050550 (3 pages).
Office Action dated Aug. 10, 2017, issued in counterpart Australian Application No. 2015210213. (5 pages).
Extended (supplementary) European Search Report dated Oct. 25, 2016, issued in counterpart European Patent Application No. 15740962.4. (7 pages).

\* cited by examiner

$CO_2$ RECOVERY APPARATUS AND $CO_2$ RECOVERY PROCESS

TECHNICAL FIELD

The invention relates to a $CO_2$ recovery apparatus and a $CO_2$ recovery process, and particularly to a $CO_2$ recovery apparatus and a $CO_2$ recovery process that recover $CO_2$ in a gas to be treated, using a $CO_2$ absorbing liquid.

BACKGROUND ART

In the related art, $CO_2$ recovery apparatuses that recover $CO_2$ exhausted from boilers or the like of thermoelectric power plants are suggested (for example, refer to PTL 1). In the $CO_2$ recovery apparatuses, after an exhaust gas is introduced into a $CO_2$ absorption tower and a $CO_2$ absorbing liquid is brought into contact with $CO_2$ contained in the exhaust gas to absorb $CO_2$, the $CO_2$ absorbing liquid that has absorbed $CO_2$ is introduced into a regeneration tower and is decarboxylated, and a high-concentration $CO_2$ gas is recovered therefrom.

CITATION LIST

Patent Literature

[PTL 1] Japanese Patent No. 3212524

SUMMARY OF INVENTION

Technical Problem

Meanwhile, in recent years, in boilers or the like of thermoelectric power plants, reduction of the amount of consumption of steam used for regeneration of the $CO_2$ absorbing liquid for further saving of energy has been desired. In the related-art $CO_2$ recovery apparatuses, the flow rate of an exhaust gas introduced into the $CO_2$ absorption tower and $CO_2$ concentration in the exhaust gas are measured, and the flow rate of the $CO_2$ absorbing liquid and the amount of consumption of steam used for regeneration of the $CO_2$ absorbing liquid is reduced on the basis of the measured exhaust gas flow rate and $CO_2$ concentration.

However, in the related-art $CO_2$ recovery apparatuses, an efficient operation control may not necessarily be performed for variations of the $CO_2$ flow rates in the exhaust gas caused by load variations of the boiler or the like, and further improvements in the efficiency and stability of the operation of the $CO_2$ recovery apparatuses are desired.

The invention has been made in view of such actual circumstances, and an object thereof is to provide a $CO_2$ recovery apparatus and a $CO_2$ recovery process that can improve the total operational efficiency and stability of the apparatus even in a case where the treatment amount of a gas to be treated varies.

Solution to Problem

A $CO_2$ recovery apparatus of the invention includes a $CO_2$ absorption tower that brings a gas to be treated containing $CO_2$ into contact with a $CO_2$ absorbing liquid and makes the $CO_2$ absorbing liquid absorb $CO_2$ contained in the gas to be treated; a $CO_2$ absorbing liquid regeneration tower that heats the $CO_2$ absorbing liquid, which has absorbed $CO_2$, with steam, releases $CO_2$ from the $CO_2$ absorbing liquid, and regenerates the $CO_2$ absorbing liquid; a flow rate measuring unit that measures the flow rates of the gas to be treated that is introduced into the $CO_2$ absorption tower; and a control unit that classifies the flow rates of the gas to be treated measured by the flow rate measuring unit into multiple flow rate ranges, and controls the flow rate of the $CO_2$ absorbing liquid supplied to the $CO_2$ absorption tower and the flow rate of steam supplied to the $CO_2$ absorbing liquid regeneration tower, on the basis of set load values that are preset according to the multiple flow rate range ranges.

According to this $CO_2$ recovery apparatus, even in a case where the flow rate of the gas to be treated increases or decreases within classifications of the multiple flow rate ranges, it is possible to maintain operation conditions on the basis of the set load values corresponding to the flow rate ranges. Accordingly, the $CO_2$ recovery apparatus is able to make the variations of the flow rate of the $CO_2$ absorbing liquid supplied to the $CO_2$ absorption tower and the flow rate of the steam supplied to the $CO_2$ absorbing liquid regeneration tower small even in a case where the flow rate of the gas to be treated may vary at any time within classifications of the multiple flow rate ranges. Thus, it is possible to improve the total operational efficiency and stability of the apparatus.

A $CO_2$ recovery apparatus of the invention includes a $CO_2$ absorption tower that brings a gas to be treated containing $CO_2$ into contact with a $CO_2$ absorbing liquid and makes the $CO_2$ absorbing liquid absorb $CO_2$ contained in the gas to be treated; a $CO_2$ absorbing liquid regeneration tower that heats the $CO_2$ absorbing liquid, which has absorbed $CO_2$, with steam, releases $CO_2$ from the $CO_2$ absorbing liquid, and regenerates the $CO_2$ absorbing liquid; a flow rate measuring unit that measures the flow rates of the gas to be treated that is introduced into the $CO_2$ absorption tower; a $CO_2$ concentration measuring unit that measures the $CO_2$ concentration of the gas to be treated that is introduced into the $CO_2$ absorption tower; and a control unit that classifies $CO_2$ flow rates in the gas to be treated, which are obtained on the basis of the flow rates of the gas to be treated that are measured by the flow rate measuring unit and the $CO_2$ concentration in the gas to be treated that is measured by the $CO_2$ concentration measuring unit, into multiple flow rate ranges, and controls the flow rate of the $CO_2$ absorbing liquid supplied to the $CO_2$ absorption tower and the flow rate of steam supplied to the $CO_2$ absorbing liquid regeneration tower, on the basis of set load values that are preset according to the multiple flow rate range classifications.

According to this $CO_2$ recovery apparatus, even in a case where the $CO_2$ flow rates increase or decrease within classifications of the multiple flow rate ranges, it is possible to maintain the operation conditions on the basis of the set load values corresponding to the flow rate ranges. Accordingly, in the $CO_2$ recovery apparatus, even in a case where the flow rate of the gas to be treated vary at any time within classifications of the multiple flow rate ranges, the variations of the flow rate of the $CO_2$ absorbing liquid supplied to the $CO_2$ absorption tower and the flow rate of the steam supplied to the $CO_2$ absorbing liquid regeneration tower can be made small. Thus, it is possible to improve the total operational efficiency and stability of the apparatus. Moreover, since this $CO_2$ recovery apparatus controls the operation conditions on the basis of the $CO_2$ flow rates calculated on the basis of the $CO_2$ concentration in the gas to be treated, it is possible to further improve the total operational efficiency and stability of the apparatus.

In the $CO_2$ recovery apparatus of the invention, it is preferable that the control unit keeps the set load values substantially constant within the multiple flow rate ranges and thereby controls the flow rate of the $CO_2$ absorbing liquid supplied to the $CO_2$ absorption tower and the flow rate of the steam supplied to the $CO_2$ absorbing liquid regeneration tower. By virtue of this configuration, the $CO_2$ recovery apparatus is able to keep the flow rate of the $CO_2$ absorbing liquid supplied to the $CO_2$ absorption tower and the flow rate of the steam supplied to the $CO_2$ absorbing liquid regeneration tower substantially constant, even if the flow rate or the like of the gas to be treated may vary at any time within the multiple flow rate ranges. Accordingly, since the $CO_2$ recovery apparatus can make the variations of the flow rate of the $CO_2$ absorbing liquid supplied to the $CO_2$ absorption tower and the flow rate of the steam supplied to the $CO_2$ absorbing liquid regeneration tower small, it is possible to further improve the total operational efficiency and stability of the apparatus.

In the $CO_2$ recovery apparatus of the invention, it is preferable that the control unit keeps the set load values at maximum values corresponding to the flow rate ranges within the multiple flow rate ranges and thereby controls the flow rate of the $CO_2$ absorbing liquid supplied to the $CO_2$ absorption tower and the flow rate of the steam supplied to the $CO_2$ absorbing liquid regeneration tower. By virtue of this configuration, the $CO_2$ recovery apparatus can control the flow rate of the $CO_2$ absorbing liquid supplied to the $CO_2$ absorption tower and the flow rate of the steam supplied to the $CO_2$ absorbing liquid regeneration tower, according to the maximum set load values within the multiple flow rate ranges. Thus, even in a case where the flow rate of the gas to be treated varies within the flow rate ranges, it is possible to appropriately control the flow rate of the $CO_2$ absorbing liquid supplied to the $CO_2$ absorption tower and the flow rate of the steam supplied to the $CO_2$ absorbing liquid regeneration tower.

In the $CO_2$ recovery apparatus of the invention, it is preferable that there are 7 or less classifications in the multiple flow rate ranges. By virtue of this configuration, in the $CO_2$ recovery apparatus, the number of the flow rate ranges is in a moderate range. Thus, it is possible to further improve the total operational efficiency and stability of the apparatus.

A $CO_2$ recovery process of the invention includes a $CO_2$ absorption step of bringing a gas to be treated containing $CO_2$ into contact with a $CO_2$ absorbing liquid in a $CO_2$ absorption tower and making the $CO_2$ absorbing liquid absorb $CO_2$ contained in the gas to be treated; a regeneration step of heating the $CO_2$ absorbing liquid, which has absorbed $CO_2$, with steam in a $CO_2$ absorbing liquid regeneration tower, releasing $CO_2$, and regenerating the $CO_2$ absorbing liquid; a step of measuring the flow rates of the gas to be treated that is introduced into the $CO_2$ absorption tower in a flow rate measuring unit; and a step of classifying the measured flow rates of the gas to be treated into multiple flow rate ranges, and controlling the flow rate of the $CO_2$ absorbing liquid supplied to the $CO_2$ absorption tower and the flow rate of steam supplied to the $CO_2$ absorbing liquid regeneration tower, on the basis of set load values that are preset according to the multiple flow rate range classifications.

According to this $CO_2$ recovery process, even in a case where the flow rate of the gas to be treated increases or decreases within classifications of the multiple flow rate ranges, it is possible to maintain operation conditions on the basis of the set load values according to the flow rate ranges. Accordingly, the CO recovery process can make the variations of the flow rate of the $CO_2$ absorbing liquid supplied to the $CO_2$ absorption tower and the flow rate of the steam supplied to the $CO_2$ absorbing liquid regeneration tower small even in a case where the flow rate of the gas to be treated vary at any time within classifications of the multiple flow rate ranges. Thus, it is possible to improve the total operational efficiency and stability of the apparatus.

A $CO_2$ recovery process of the invention includes a $CO_2$ absorption step of bringing a gas to be treated containing $CO_2$ into contact with a $CO_2$ absorbing liquid in a $CO_2$ absorption tower and making the $CO_2$ absorbing liquid absorb $CO_2$ contained in the gas to be treated; a regeneration step of heating the $CO_2$ absorbing liquid, which has absorbed $CO_2$, with steam in a $CO_2$ absorbing liquid regeneration tower, releasing $CO_2$, and regenerating the $CO_2$ absorbing liquid; a step of measuring the flow rates of the gas to be treated, which is introduced into the $CO_2$ absorption tower, in a flow rate measuring unit, and measuring the $CO_2$ concentration of the gas to be treated, which is introduced into the $CO_2$ absorption tower, in a $CO_2$ concentration measuring unit; and a step of classifying $CO_2$ flow rates, which are obtained on the basis of the measured flow rates of the gas to be treated and the measurement value of the $CO_2$ concentration, into multiple flow rate ranges, and controlling the flow rate of the $CO_2$ absorbing liquid supplied to the $CO_2$ absorption tower and the flow rate of steam supplied to the $CO_2$ absorbing liquid regeneration tower, on the basis of set load values that are preset according to the multiple flow rate range classifications.

According to this $CO_2$ recovery process, even in a case where the $CO_2$ flow rates increase or decrease within classifications of the multiple flow rate ranges, it is possible to maintain operation conditions on the basis of the set load values according to the flow rate ranges. By virtue of this process, the $CO_2$ recovery process can make the variations of the flow rate of the $CO_2$ absorbing liquid supplied to the $CO_2$ absorption tower and the flow rate of the steam supplied to the $CO_2$ absorbing liquid regeneration tower even small in a case where the flow rate of the gas to be treated may vary at any time within classifications of the multiple flow rate ranges. Thus, it is possible to improve the total operational efficiency and stability of the apparatus. Moreover, since this $CO_2$ recovery process controls the operation conditions on the basis of the $CO_2$ flow rates calculated on the basis of the $CO_2$ concentration in the gas to be treated, it is possible to further improve the total operational efficiency and stability of the apparatus.

In the $CO_2$ recovery process of the invention, it is preferable that the set load values are kept substantially constant within the multiple flow rate ranges and thereby the flow rate of the $CO_2$ absorbing liquid supplied to the $CO_2$ absorption tower and the flow rate of the steam supplied to the $CO_2$ absorbing liquid regeneration tower are controlled. By virtue of this process, the $CO_2$ recovery process can keep the flow rate of the $CO_2$ absorbing liquid supplied to the $CO_2$ absorption tower and the flow rate of the steam supplied to the $CO_2$ absorbing liquid regeneration tower substantially constant, even if the flow rate or the like of the gas to be treated may vary at any time within the multiple flow rate ranges. Accordingly, since the $CO_2$ recovery process can make the variations of the flow rate of the $CO_2$ absorbing liquid supplied to the $CO_2$ absorption tower and the flow rate of the steam supplied to the $CO_2$ absorbing liquid regeneration tower small, it is possible to further improve the total operational efficiency and stability of the apparatus.

In the $CO_2$ recovery process of the invention, it is preferable that the set load values are kept at maximum values corresponding to the flow rate ranges within the multiple flow rate ranges and thereby the flow rate of the $CO_2$ absorbing liquid supplied to the $CO_2$ absorption tower and the flow rate of the steam supplied to the $CO_2$ absorbing liquid regeneration tower are controlled. By virtue of this process, the $CO_2$ recovery process can control the flow rate of the $CO_2$ absorbing liquid supplied to the $CO_2$ absorption tower and the flow rate of the steam supplied to the $CO_2$ absorbing liquid regeneration tower, according to the set maximum load values within the flow rate ranges. Thus, even in a case where the flow rate of the gas to be treated varies within the flow rate ranges, it is possible to appropriately control the flow rate of the $CO_2$ absorbing liquid supplied to the $CO_2$ absorption tower and the flow rate of the steam supplied to the $CO_2$ absorbing liquid regeneration tower.

In the $CO_2$ recovery process of the invention, it is preferable that there are 7 or less classifications in the multiple flow rate ranges. By virtue of this process, the number of the flow rate ranges is in a moderate range. Thus, it is possible to further improve the total operational efficiency and stability of the apparatus.

Advantageous Effects of Invention

According to the invention, it is possible to realize the $CO_2$ recovery apparatus and the $CO_2$ recovery process that can improve the total operational efficiency and stability of the apparatus even in a case where the treatment amount of a gas to be treated varies.

DESCRIPTION OF EMBODIMENTS

The present inventors have paid their attention to the fact that, in the related-art $CO_2$ recovery apparatuses, operation conditions cannot be necessarily and sufficiently optimized with respect to load variations of a boiler or the like even if the flow rates or the like of an exhaust gas supplied to a $CO_2$ absorption tower are measured and the operation control off the $CO_2$ recovery apparatuses is performed. Also, the present inventors have found out that total operational efficiency and stability of the apparatuses are improved by classifying the treatment amounts of the exhaust gas into multiple ranges, setting set load values to the classified ranges in advance, and stepwisely performing operation control, even in cases where load variations of the boiler or the like have occurred, and have completed the invention.

Hereinafter, embodiments of the invention will be described in detail with reference to the accompanying drawings. In addition, the invention is not limited to the following embodiments, can be appropriately changed and carried out. Additionally, the configurations of $CO_2$ recovery apparatuses related to the following respective embodiments can be appropriately combined and carried out.

First Embodiment

Figure 1:
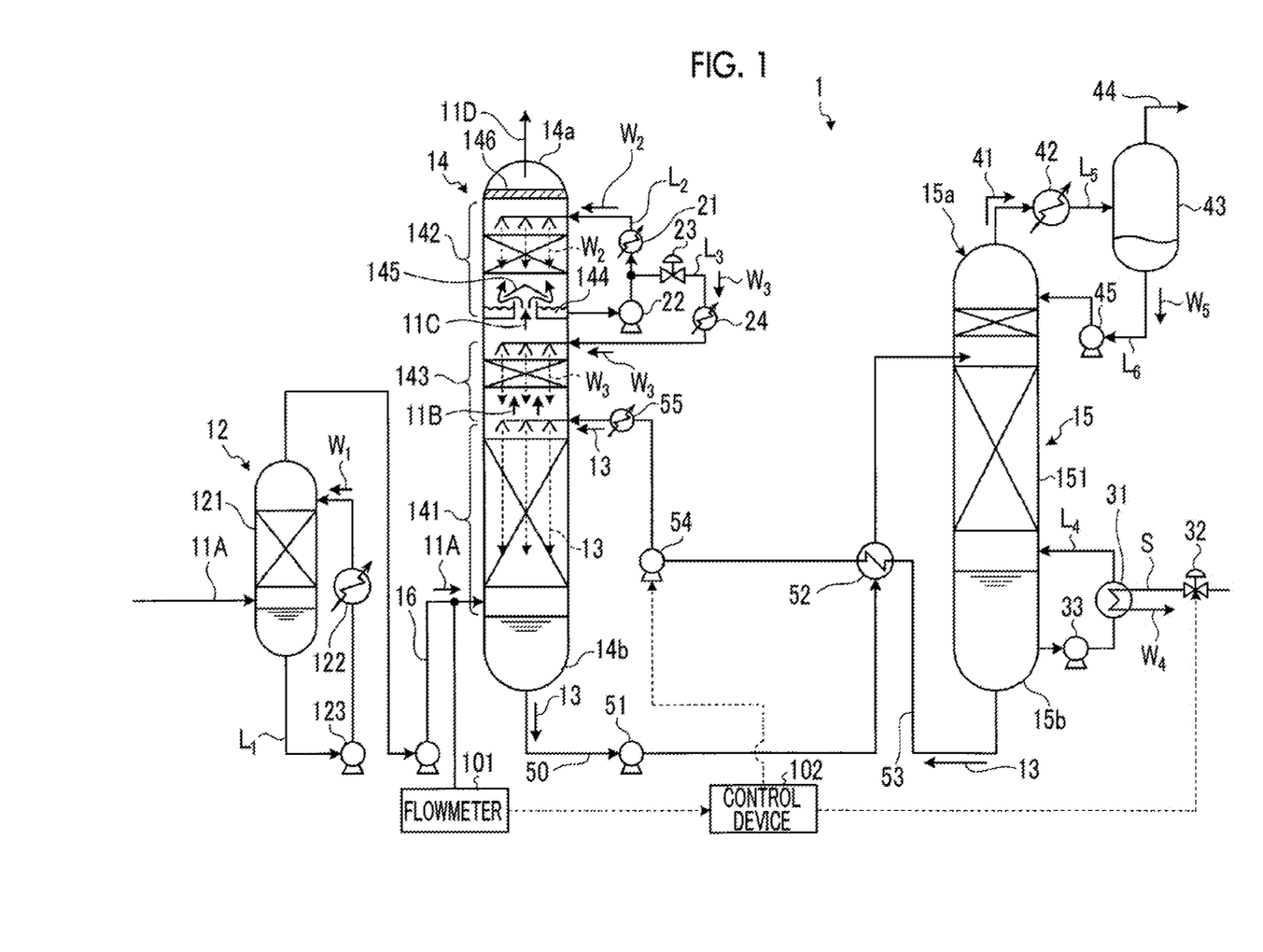
FIG. 1 is a schematic view of a $CO_2$ recovery apparatus related to a first embodiment.

FIG. 1 is a schematic view of a $CO_2$ recovery apparatus related to a first embodiment of the invention. As illustrated in FIG. 1, the $CO_2$ recovery apparatus 1 is an apparatus that absorbs $CO_2$ in an exhaust gas (a gas to be treated) 11A containing $CO_2$ exhausted from industrial facilities, such as a boiler and a gas turbine, and recovers a high-concentration $CO_2$ gas. The $CO_2$ recovery apparatus 1 includes a cooling tower 12 that cools the exhaust gas 11A containing $CO_2$ exhausted from industrial facilities, such as a boiler and a gas turbine; a $CO_2$ absorption tower 14 that is provided in a subsequent stage of the cooling tower 12, brings the cooled exhaust gas 11A into contact with a $CO_2$ absorbing liquid 13, and makes the $CO_2$ absorbing liquid 13 absorb and remove $CO_2$ in the exhaust gas 11A; and a $CO_2$ absorbing liquid regeneration tower 15 that is provided in the subsequent stage of the $CO_2$ absorption tower 14, releases $CO_2$ from the $CO_2$ absorbing liquid 13 that has absorbed the $CO_2$, and regenerates $CO_2$ absorbing liquid 13 is provided.

Additionally, the $CO_2$ recovery apparatus 1 includes a flowmeter (flow rate measuring unit) 101 that is provided in a flue 16 between the cooling tower 12 and the $CO_2$ absorption tower 14, and measures the flow rates of the exhaust gas 11A introduced into the $CO_2$ absorption tower 14, and a control unit 102 that classifies the flow rates of the exhaust gas 11A measured by the flowmeter 101 into multiple flow rate ranges, and controls the flow rate of the $CO_2$ absorbing liquid 13 supplied to the $CO_2$ absorption tower 14 and the flow rate of steam supplied to the $CO_2$ absorbing liquid regeneration tower 15, on the basis of set load values that are preset according to the multiple flow rate range classifications. The control unit 102 can be realized, for example, using a general-purpose computer or an exclusive computer, such as a central arithmetic unit (CPU), a read-only memory (ROM), or a random access memory (RAM), and programs that operate on this computer.

In the $CO_2$ recovery apparatus 1, the $CO_2$ absorbing liquid 13 circulates between the $CO_2$ absorption tower 14 and the $CO_2$ absorbing liquid regeneration towers 15. The $CO_2$ absorbing liquid 13 (lean solution) is supplied to the $CO_2$ absorbing liquid regeneration tower 15 as the $CO_2$ absorbing liquid 13 (rich solution) that has absorbed $CO_2$ in the $CO_2$ absorption tower 14. Additionally, the $CO_2$ absorbing liquid 13 (rich solution) is supplied to the $CO_2$ absorption tower 14 as the $CO_2$ absorbing liquid 13 (lean solution) from which substantially all $CO_2$ has been removed and regenerated in the $CO_2$ absorbing liquid regeneration tower 15.

The cooling tower 12 has a cooling section 121 that cools the exhaust gas 11A. A circulation line $L_1$ is provided between a bottom part of the cooling tower 12 and a top part of the cooling section 121. A heat exchanger 122 that cools cooling water $W_1$, and a circulation pump 123 circulate the cooling water $W_1$ within the circulation line $L_1$ are provided in the circulation line $L_1$.

In the cooling section 121, the exhaust gas 11A is cooled by bringing the exhaust gas 11A into countercurrent contact with the cooling water $W_1$. The heat exchanger 122 cools the cooling water $W_1$ heated by the heat exchange with the exhaust gas 11A. The circulation pump 123 supplies the cooling water $W_1$, which has flowed down the bottom part of the cooling tower 12, to the top part of the cooling section 121 via the heat exchanger 122.

The $CO_2$ absorption tower 14 includes a $CO_2$ absorption section 141 that is provided on a lower part side of the $CO_2$ absorption tower 14 and has the exhaust gas 11A and the $CO_2$ absorbing liquid 13 (lean solution) cooled in the cooling tower 12 supplied thereto, a main washing section 142 that is provided on an upper part side of the $CO_2$ absorption tower 14, and a preliminary washing section 143 that is provided between and the $CO_2$ absorption section 141 and the main washing section 142. A liquid storage section 144 that stores washing water $W_2$ for cleaning an exhaust gas 11C from which $CO_2$ has been removed is provided at a bottom part of the main washing section 142. A circulation line $L_2$, through which the washing water $W_2$, containing the $CO_2$ absorbing liquid 13 recovered in the liquid storage section 144, is supplied and circulated from a top part side of the main washing section 142, is provided between the liquid storage section 144 and an upper part of the main washing section 142. The circulation line $L_2$ is provided with a heat exchanger 21 that cools the washing water $W_2$, and a circulation pump 22 that circulates the washing water $W_2$, containing the $CO_2$ absorbing liquid 13 recovered in the liquid storage section 144, within the circulation line $L_2$ via the heat exchanger 21. Additionally, the circulation line $L_2$ is provided with an extraction line $L_3$ through which a portion of the washing water $W_2$ (washing water $W_3$) is extracted and supplied to the preliminary washing section 143. The extraction line $L_3$ is provided with an adjusting valve 23 that adjusts the amount of supply of washing water $W_3$ supplied to the preliminary washing section 143, and a heat exchanger 24 that cools the washing water $W_3$ to a predetermined temperature.

In the $CO_2$ absorption section 141, the exhaust gas 11A containing $CO_2$ and the $CO_2$ absorbing liquid 13 containing alkanolamine or the like come into countercurrent contact with each other. Accordingly, $CO_2$ in the exhaust gas 11A is absorbed by the $CO_2$ absorbing liquid 13 through a chemical reaction shown in the following Formula. As a result, the exhaust gas 11A containing $CO_2$ becomes an exhaust gas 11B from which $CO_2$ has been removed by passing through the $CO_2$ absorption section 141.

$$R\text{—}NH_2+H_2O+CO_2 \rightarrow R\text{—}NH_3HCO_3$$

In the preliminary washing section 143, the exhaust gas 11B from which $CO_2$ has been removed is brought into gas-liquid contact with the washing water $W_3$ extracted from the main washing section 142, and is cleaned. As a result, the exhaust gas 11B from which $CO_2$ has been removed becomes the exhaust gas 11C in which the $CO_2$ absorbing liquid 13 entrained in the exhaust gas 11B has decreased.

In the main washing section 142, the exhaust gas 11C from which $CO_2$ that has passed through the preliminary washing section 143 has been removed rises via a chimney tray 145. Then, the exhaust gas 11C is brought into gas-liquid contact with the washing water $W_2$ supplied from the top part side of the main washing section 142, and becomes an exhaust gas 11D from which the $CO_2$ absorbing liquid 13 entrained in the exhaust gas 11C has been recovered by circulation cleaning. The exhaust gas 11D is exhausted to the outside from a tower top part 14a of the $CO_2$ absorption tower 14 after mist in the gas is trapped by a mist eliminator 146.

A rich solution supply tube 50 through which the $CO_2$ absorbing liquid 13 (rich solution), which has absorbed $CO_2$ in the $CO_2$ absorption tower 14, is supplied to an upper part side of the $CO_2$ absorbing liquid regeneration tower 15 is provided between a tower bottom part 14b of the $CO_2$ absorption tower 14 and an upper part of the $CO_2$ absorbing liquid regeneration tower 15. The rich solution supply tube 50 is provided with a rich solvent pump 51 that supplies the $CO_2$ absorbing liquid 13 (rich solution), which has absorbed $CO_2$ in the $CO_2$ absorption tower 14, toward the $CO_2$ absorbing liquid regeneration tower 15, and a rich-lean solution heat exchanger 52 that heats the $CO_2$ absorbing liquid 13 (rich solution) that has absorbed $CO_2$, using the $CO_2$ absorbing liquid 13 (lean solution) which has been heated with steam and from which $CO_2$ has been removed.

A central part of the CO absorbing liquid regeneration tower 15 is provided with a $CO_2$ absorbing liquid supply section 151 to which the $CO_2$ absorbing liquid 13 that has absorbed $CO_2$ is supplied. A tower bottom part 15b of the $CO_2$ absorbing liquid regeneration tower 15 is provided with a circulation line $L_4$ through which the $CO_2$ absorbing liquid 13 that has flowed down to the tower bottom part 15b circulates. The circulation line $L_4$ is provided with a regenerative heater 31 that heats the $CO_2$ absorbing liquid 13 with saturated steam S, an adjusting valve 32 that adjusts the amount of saturated steam S supplied to the regenerative heater 31, and a circulation pump 33 that supplies the $CO_2$ absorbing liquid 13 of the tower bottom part 15b of the $CO_2$ absorbing liquid regeneration tower 15 to a lower part of the $CO_2$ absorbing liquid supply section 151 of the $CO_2$ absorbing liquid regeneration tower 15 via the regenerative heater 31. The adjusting valve 32 is adjusted in opening degree by the control unit 102, and adjusts the amount of the saturated steam S supplied to the regenerative heater 31.

A tower top part 15a of the $CO_2$ absorbing liquid regeneration tower 15 is provided with a gas exhaust line $L_5$ through which a $CO_2$ gas 41 accompanied by steam is exhausted. The gas exhaust line $L_5$ is provided with a condenser 42 that condenses moisture in the $CO_2$ gas 41, and a separation drum 43 that separates the $CO_2$ gas 41 from condensed water $W_5$. A $CO_2$ gas 44 from which the condensed water $W_5$ has been separated is released to the outside from an upper part of the separation drum 43. A condensed water line $L_6$ through which the condensed water $W_5$ separated by the separation drum 43 is supplied to the upper part of the $CO_2$ absorbing liquid regeneration tower 15 is provided between a bottom part of the separation drum 43 and the upper part of the $CO_2$ absorbing liquid regeneration tower 15. The condensed water line $L_6$ is provided with a condensed water circulation pump 45 that supplies the condensed water $W_5$ separated by the separation drum 43 to the upper part of the $CO_2$ absorbing liquid regeneration tower 15.

Additionally, the tower bottom part 15b of the $CO_2$ absorbing liquid regeneration tower 15 and an upper part of the $CO_2$ absorption section 141 of the $CO_2$ absorption tower 14 are provided with a lean solution supply tube 53 through which a lean solution in the tower bottom part 15b of the $CO_2$ absorbing liquid regeneration tower 15 is supplied to the upper part of the $CO_2$ absorption section 141. The lean solution supply tube 53 is provided with the rich-lean solution heat exchanger 52 that heats the $CO_2$ absorbing liquid 13 (rich solution), which has absorbed $CO_2$, using the $CO_2$ absorbing liquid 13 (lean solution) which has been heated with steam and from which $CO_2$ has been removed, a lean solution pump 54 that supplies the lean solution in the tower bottom part 15b of the $CO_2$ absorbing liquid regeneration tower 15 to the upper part of the $CO_2$ absorption section 141, and a cooling section 55 that cools the $CO_2$ absorbing liquid 13 (lean solution) to a predetermined temperature. In the lean solution pump 54, the amount of supply of the $CO_2$ absorbing liquid 13 (lean solution) is controllable by the control unit 102.

Figure 2:
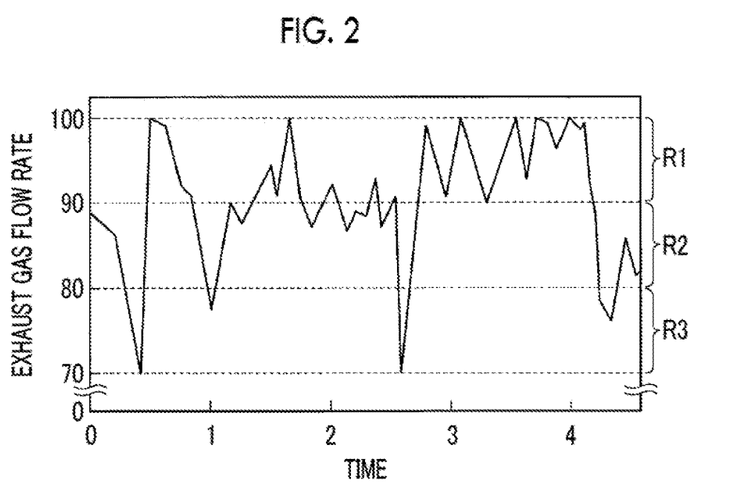
FIG. 2 is a view illustrating the relationship between the operation time of the $CO_2$ recovery apparatus related to the first embodiment and changes in exhaust gas flow rate.
Figure 3:
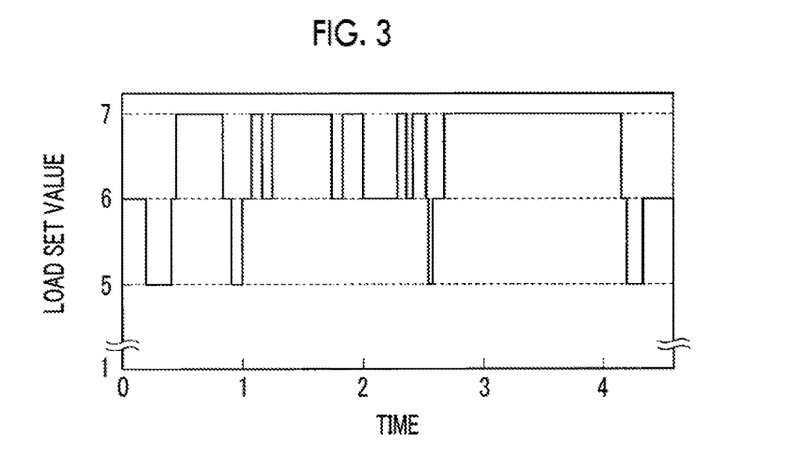
FIG. 3 is a view illustrating the relationship between the operation time of the $CO_2$ recovery apparatus related to the first embodiment and set load values of the $CO_2$ recovery apparatus.

Next, the control of the operation conditions of the $CO_2$ recovery apparatus 1 related to the present embodiment will be described below with reference to FIGS. 2 and 3. FIG. 2 is a view illustrating the relationship between the operation time of the $CO_2$ recovery apparatus 1 related to the present embodiment and changes in exhaust gas flow rate, and FIG. 3 is a view illustrating the relationship between the operation time of the $CO_2$ recovery apparatus 1 related to the present embodiment and the set load values of the $CO_2$ recovery apparatus 1.

As illustrated in FIG. 2, in the $CO_2$ recovery apparatus 1 related to the present embodiment, for example, the flow rate of an exhaust gas exhausted from industrial facilities, such as a boiler and a gas turbine varies depending on variations or the like of generated electric power accompanied by changes in electric power demand. In the $CO_2$ recovery apparatus 1 related to the present embodiment, for example, as illustrated in FIG. 2, the exhaust gas flow rate varies at any time within a range of 70 or more and 100 or less with the lapse of time. Here, for example, in a case where the exhaust gas flow rate greatly varies within a range of 70 to 100 like within a time range of 0 or more and 1 or less illustrated in FIG. 2, the control unit 102 is able to increase the flow rate of the $CO_2$ absorbing liquid 13 supplied to the $CO_2$ absorption tower 14, and increase the flow rate of steam supplied to the $CO_2$ absorbing liquid regeneration tower 15, thereby optimize the operation conditions. However, in a case where the exhaust gas flow rate varies on a small scale at any time within a range of 90 or more and 100 or less like within a time range of 3 or more and 4 or less illustrated in FIG. 2, even if the operation conditions are finely controlled, operation conditions after a change may not be reflected on variations of an actual exhaust gas flow rate, and sufficient operation control may not be able to be performed.

Therefore, in the present embodiment, the exhaust gas flow rates per unit time measured by the flowmeter 101 are classified into multiple flow rate ranges R1 to R7 (R4 to R7 are not illustrated) that are set in advance. For example, in the example illustrated in FIG. 2, the control unit 102 classifies the exhaust gas flow rates as seven stages having a range where the exhaust gas flow rates of the exhaust gas 11A measured by the flowmeter 101 are more than 90 and 100 or less as a flow rate range R1, a range where the exhaust gas flow rates are more than 80 and 90 or less as a flow rate range R2, a range where the exhaust gas flow rates are more than 70 and 80 or less as a flow rate range R3, a range where the exhaust gas flow rates are more than 60 and 70 or less as a flow rate range R4, a range where the exhaust gas flow rates are more than 50 and 60 or less as a flow rate range R5, a range where the exhaust gas flow rate are more than 40 and 50 or less as a flow rate range R6, and a range where the exhaust gas flow rates are more than zero and 40 or less as a flow rate range R7.

Also, the control unit 102 adjusts the flow rate of the lean solution pump 54 and the opening degree of the adjusting valve 32 on the basis of the set load values that are preset according to the flow rate ranges R1 to R7 classified into the seven stages, and controls the flow rate of the $CO_2$ absorbing liquid 13 supplied to the $CO_2$ absorption tower 14 and the flow rate of steam supplied to the $CO_2$ absorbing liquid regeneration tower 15. In addition, the set load values herein are, for example, the specific flow rates of the lean solution pump 54 and the specific opening degrees of the adjusting valve 32 that are preset according to the flow rate ranges R1 to R7.

In a case where the exhaust gas flow rate is the flow rate range R1, the control unit 102 adjusts the flow rate of the lean solution pump 54 and the opening degree of the adjusting valve 32 in a range where the preset load values are 6 or more and 7 or less, and controls the flow rate of the $CO_2$ absorbing liquid 13 supplied to the $CO_2$ absorption tower 14 and the flow rate of steam supplied to the $CO_2$ absorbing liquid regeneration tower 15. Similarly, in a case where the exhaust gas flow rate is the flow rate range R2, the control unit 102 adjusts the flow rate of the lean solution pump 54 and the opening degree of the adjusting valve 32 in a range where the preset load values are 5 or more and 6 or less.

In a case where the exhaust gas flow rate is the flow rate range R3, the control unit 102 adjusts the flow rate of the lean solution pump 54 and the opening degree of the adjusting valve 32 in a range where the preset load values are 4 or more and 5 or less. In a case where the exhaust gas flow rate is the flow rate range R4, the control unit 102 adjusts the flow rate of the lean solution pump 54 and the opening degree of the adjusting valve 32 in a range where the preset load values are 3 or more and 4 or less.

In a case where the exhaust gas flow rate is the flow rate range R5, the control unit 102 adjusts the flow rate of the lean solution pump 54 and the opening degree of the adjusting valve 32 in a range where the preset load values are 2 or more and 3 or less. In a case where the exhaust gas flow rate is the flow rate range R6, the control unit 102 adjusts the flow rate of the lean solution pump 54 and the opening degree of the adjusting valve 32 in a range where the preset load values are 1 or more and 2 or less.

In a case where the exhaust gas flow rate is the flow rate range R7, the control unit 102 adjusts the flow rate of the lean solution pump 54 and the opening degree of the adjusting valve 32 in a range where the preset load values are more than 0 and 1 or less. As the control unit 102 controls the operation condition of the $CO_2$ recovery apparatus 1 in this way, it is possible to appropriately control the operation conditions over variations of the actual exhaust gas flow rate even in a case where the exhaust gas flow rate varies on a small scale at any time within a range of the flow rate ranges R1 to R7. In addition, the control unit 102 may appropriately change the set load values to control operation according to elapsed time as long as it is within a range of the set load values corresponding to the range of the flow rate ranges R1 to R7.

Additionally, in the $CO_2$ recovery apparatus 1 related to the present embodiment, it is preferable that the control unit 102 keeps the set load values substantially constant to control the flow rate of the $CO_2$ absorbing liquid 13 supplied to the $CO_2$ absorption tower 14 and the flow rate of the saturated steam S supplied to the $CO_2$ absorbing liquid regeneration tower 15, within the above-described multiple flow rate ranges R1 to R7. For example, as illustrated at the times 3 to 4 of FIGS. 2 and 3, the set load value is kept at 7 in a case where the exhaust gas flow rate is in the flow rate range R1. Accordingly, even if the flow rate or the like of the exhaust gas 11A varies within the flow rate range R1, it is possible to keep the flow rate of the $CO_2$ absorbing liquid 13 supplied to the $CO_2$ absorption tower 14 and the flow rate of the saturated steam S supplied to the $CO_2$ absorbing liquid regeneration tower 15 substantially constant. Accordingly, since the variations of the flow rate of the $CO_2$ absorbing liquid 13 supplied to the $CO_2$ absorption tower 14 and the flow rate of the steam S supplied to the $CO_2$ absorbing liquid regeneration tower 15 can be made small, it is possible to improve the total operational efficiency and stability of the apparatus.

Moreover, in the $CO_2$ recovery apparatus 1 related to the present embodiment, it is preferable that the control unit 102 keeps the set load values at maximum values corresponding to the flow rate ranges R1 to R7 to control the flow rate of the $CO_2$ absorbing liquid 13 supplied to the $CO_2$ absorption tower 14 and the flow rate of the steam S supplied to the $CO_2$ absorbing liquid regeneration tower 15, within the multiple flow rate ranges R1 to R7. For example, as illustrated at the times 3 to 4 of FIGS. 2 and 3, in a case where the exhaust gas flow rate is in the flow rate range R1, the set load value is kept at 7 that is a maximum value of 6 or more and 7 or less corresponding to the flow rate range R1. Accordingly, the operation conditions of the flow rate of the $CO_2$ absorbing liquid 13 supplied to the $CO_2$ absorption tower 14 and the flow rate of the saturated steam S supplied to the $CO_2$ absorbing liquid regeneration tower 15, according to the set maximum load values within the flow rate ranges R1 to R7, can be controlled. Thus, even in a case where the flow rate of the exhaust gas 11A varies within the flow rate ranges R1 to R7, it is possible to appropriately control the flow rate of the $CO_2$ absorbing liquid 13 supplied to the $CO_2$ absorption tower 14 and the flow rate of the steam S supplied to the $CO_2$ absorbing liquid regeneration tower 15.

Additionally, in the $CO_2$ recovery apparatus 1 related to the present embodiment, it is preferable that the control unit 102 classifies the flow rate ranges of the exhaust gas flow rates of the exhaust gas 11A to be set in advance into the seven stages. Accordingly, since the number of the flow rate ranges R1 to R7 to be set in advance is in a moderate range, it is possible to improve the total operational efficiency and stability of the $CO_2$ recovery apparatus 1. In addition, the flow rate ranges of the exhaust gas flow rates are not limited to the seven stages, and the exhaust gas flow rates may be classified into seven stages or more, or less than seven stages.

Figure 4:
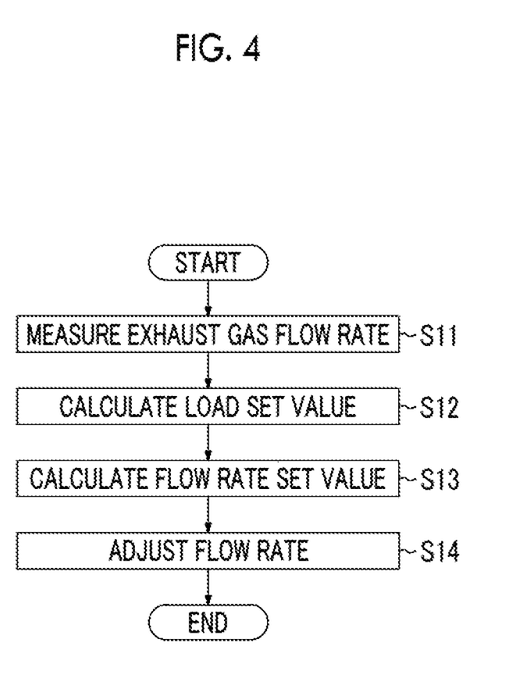
FIG. 4 is a flowchart of the operation control of the $CO_2$ recovery apparatus related to the first embodiment.

Next, the overall operation of the $CO_2$ recovery apparatus 1 related to the present embodiment will be described with reference to FIG. 4. FIG. 4 is a flowchart of the operation control of the $CO_2$ recovery apparatus 1 related to the present embodiment. As illustrated in FIG. 4, in the $CO_2$ recovery apparatus 1 related to the present embodiment, the flowmeter 101 measures the exhaust gas flow rates of the exhaust gas 11A introduced into the $CO_2$ absorption tower 14 (Step S11), and the control unit 102 classifies the exhaust gas flow rates detected by the flowmeter 101 into the preset flow rate ranges, and calculates the set load value according to the classified flow rate ranges (Step S12). Then, the control unit 102 calculates the flow rate of the $CO_2$ absorbing liquid 13 supplied to the $CO_2$ absorption tower 14 and the flow rate of the steam S supplied to the $CO_2$ absorbing liquid regeneration tower 15 according to the set load values (Step S13), and adjusts the flow rate of the lean solution pump 54 and the opening degree of the adjusting valve 32 so that the calculated flow rates are obtained (Step S14).

The exhaust gas 11A containing $CO_2$ exhausted from industrial facilities, such as a boiler and a gas turbine, is introduced into the cooling tower 12, and is brought into countercurrent contact with and cooled by the cooling water $W_1$. The cooled exhaust gas 11A is introduced into the $CO_2$ absorption tower 14 via the flue 16, and the flow rates of the exhaust gas 11A introduced into the $CO_2$ absorption tower 14 are measured. The exhaust gas 11A introduced into the $CO_2$ absorption tower 14 is brought into countercurrent contact with and cooled by the $CO_2$ absorbing liquid 13 containing alkanolamine or the like in the $CO_2$ absorption section 141, and becomes the exhaust gas 11B from which $CO_2$ in the exhaust gas 11A has been absorbed by the $CO_2$ absorbing liquid 13 and $CO_2$ has been removed.

The exhaust gas 11B from which $CO_2$ has been removed is brought into gas-liquid contact with and cleaned by the washing water $W_3$, which is a portion of the washing water $W_2$ extracted from the main washing section 142, in the preliminary washing section 143, and becomes the exhaust gas 11C in which the $CO_2$ absorbing liquid 13 entrained in the exhaust gas 11B has decreased. The exhaust gas 11C rises via the chimney tray 145, is brought into gas-liquid contact with the washing water $W_2$ supplied from the top part side of the main washing section 142, and becomes the exhaust gas 11D from which the $CO_2$ absorbing liquid 13 entrained in the exhaust gas 11C has been recovered by circulation cleaning. The exhaust gas 11D is exhausted to the outside from the tower top part 14a of the $CO_2$ absorption tower 14 after mist in the gas is trapped by a mist eliminator 146.

The $CO_2$ absorbing liquid 13 (rich solution) that has absorbed $CO_2$ in the $CO_2$ absorption tower 14 is supplied to the upper part of the $CO_2$ absorbing liquid regeneration tower 15 by the rich solvent pump 51 after being heat-exchanged with the $CO_2$ absorbing liquid 13 (lean solution) in the rich-lean solution heat exchanger 52 via the rich solution supply tube 50. The $CO_2$ absorbing liquid 13 supplied to the $CO_2$ absorbing liquid regeneration tower 15 has $CO_2$ removed therefrom and becomes a semi-lean solution, while flowing down to the tower bottom part 15b via the $CO_2$ absorbing liquid supply section 151. This semi-lean solution while is circulates through the circulation line $L_4$ by the circulation pump 33, is heated by the saturated steam S in the regenerative heater 31, and becomes a lean solution. Here, the control unit 102 controls the opening degree of the adjusting valve 32 so that the amount of supply of the saturated steam S is obtained on the basis of set load values according to the flow rate ranges of the exhaust gas flow rates of the exhaust gas 11A measured by the flowmeter 101. The saturated steam S after being heated becomes the steam condensed water $W_4$. The $CO_2$ gas 41 removed from the $CO_2$ absorbing liquid 13 is released to the outside as the $CO_2$ gas 44 from which the condensed water $W_5$ has been separated through the upper part of the separation drum 43 after the moisture thereof is condensed by the condenser 42.

The $CO_2$ absorbing liquid 13 (lean solution) of the tower bottom part 15b of the $CO_2$ absorbing liquid regeneration tower 15 is supplied to the upper part of the $CO_2$ absorption section 141 of the $CO_2$ absorption tower 14 by the lean solution pump 54 after being heat-exchanged with the $CO_2$ absorbing liquid 13 (rich solution) by the rich-lean solution heat exchanger 52 via the lean solution supply tube 53. Here, the control unit 102 controls the flow rate of the lean solution pump 54 on the basis of the set load values according to the flow rate ranges R1 to R7 of the exhaust gas flow rates of the exhaust gas 11A measured by the flowmeter 101.

As described above, according to the present embodiment, even in a case where the flow rate of the exhaust gas 11A increases or decreases within classifications of the multiple flow rate ranges R1 to R7, it is possible to maintain the operation conditions on the basis of the set load values corresponding to the flow rate ranges R1 to R7. Accordingly, in the $CO_2$ recovery apparatus, even in a case where the flow rate of the exhaust gas 11A may vary at any time within classifications of the multiple flow rate ranges R1 to R7, the variations of the flow rate of the $CO_2$ absorbing liquid 13 supplied to the $CO_2$ absorption tower 14 and the flow rate of the steam S supplied to the $CO_2$ absorbing liquid regeneration tower 15 can be made small. Thus, it is possible to improve the total operational efficiency and stability of the apparatus.

In addition, an example in which the exhaust gas 11A containing $CO_2$ exhausted from industrial facilities, such as a boiler and a gas turbine, is treated by the $CO_2$ absorbing liquid 13 has been described in the above-described embodiment. However, as gases to be treated that is treated by the $CO_2$ absorbing liquid 13, various gases can be applied if they are gases containing $CO_2$.

Second Embodiment

Next, a second embodiment of the invention will be described. In addition, constituent elements common to those of the $CO_2$ recovery apparatus 1 related to the above-described first embodiment will be designated by the same reference signs, and duplication of description thereof will be avoided.

Figure 5:
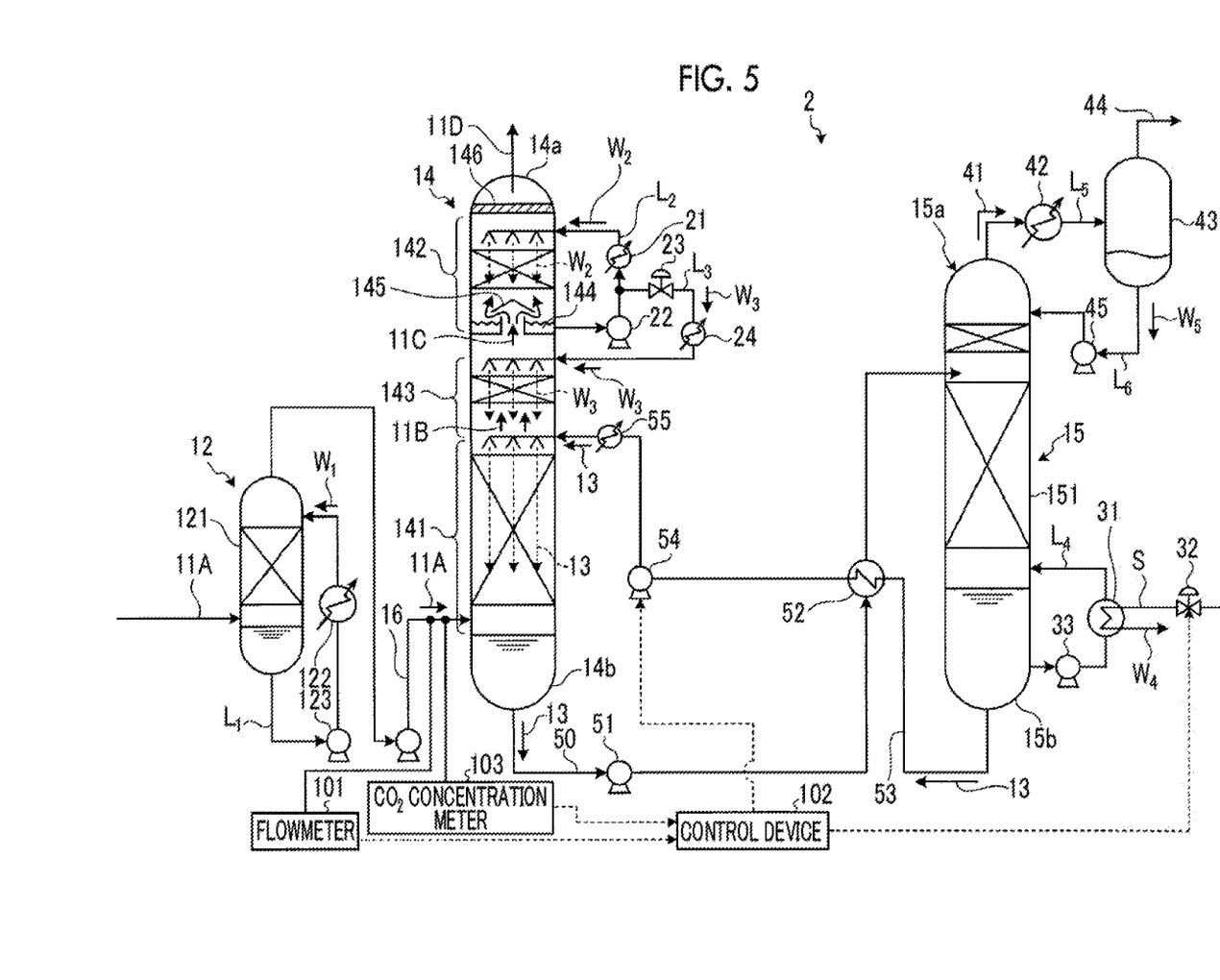
FIG. 5 is a schematic view of a $CO_2$ recovery apparatus related to a second embodiment.

FIG. 5 is a schematic view of a $CO_2$ recovery apparatus 2 related to a second embodiment of the invention. A $CO_2$ recovery apparatus 2 related to the present embodiment includes a $CO_2$ concentration meter ($CO_2$ concentration measuring unit) 103 that measures $CO_2$ concentration in the exhaust gas 11A, in the flue 16, in addition to the configuration of the $CO_2$ recovery apparatus 1 related to the above-described first embodiment. The control unit 102 obtains $CO_2$ flow rates in the exhaust gas 11A, on the basis of the exhaust gas flow rates of the exhaust gas 11A measured by the flowmeter 101 and the $CO_2$ concentration in the exhaust gas 11A measured by a $CO_2$ concentration meter 103. The $CO_2$ concentration meter 103 is not particularly limited if the $CO_2$ concentration in the exhaust gas 11A can be measured.

Figure 6:
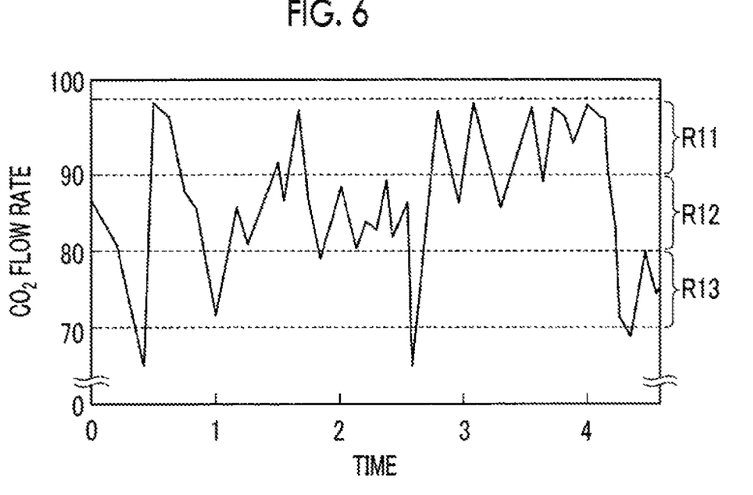
FIG. 6 is a view illustrating the relationship between the operation time of the $CO_2$ recovery apparatus related to the second embodiment and changes in $CO_2$ flow rate.
Figure 7:
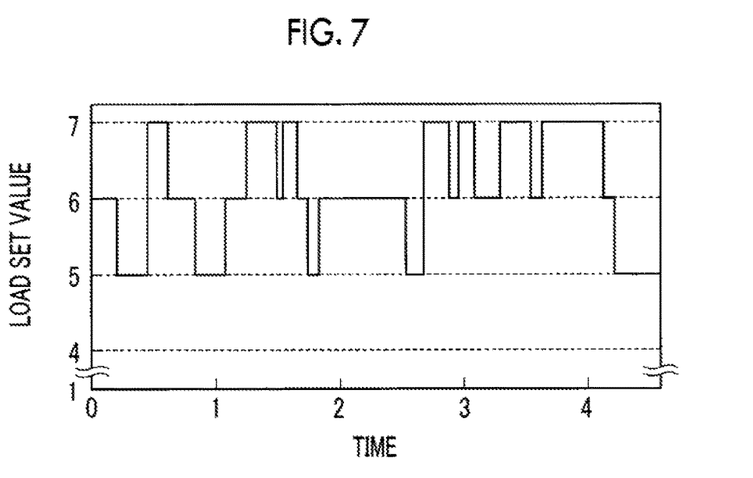
FIG. 7 is a view illustrating the relationship between the operation time of the $CO_2$ recovery apparatus related to the second embodiment and set load values of the $CO_2$ recovery apparatus.

Next, the control of the operation conditions of the $CO_2$ recovery apparatus 2 related to the present embodiment will be described below with reference to FIGS. 6 and 7. FIG. 6 is a view illustrating the relationship between the operation time of the $CO_2$ recovery apparatus 2 related to the present embodiment and changes in $CO_2$ flow rate, and FIG. 7 is a view illustrating the relationship between the operation time of the $CO_2$ recovery apparatus 2 related to the present embodiment and the set load values of the $CO_2$ recovery apparatus 2.

As illustrated in FIG. 6, in the present embodiment, the control unit 102 calculates $CO_2$ flow rates on the basis of the exhaust gas flow rates of the exhaust gas 11A measured by the flowmeter 101 and the $CO_2$ concentration of the exhaust gas 11A measured by the $CO_2$ concentration meter 103, and classifies the calculated $CO_2$ flow rates into multiple flow rate ranges R11 to R17 (R14 to R17 are not illustrated). For example, in the example illustrated in FIG. 6, the control unit 102 classifies the $CO_2$ flow rates as seven stages having a range where the $CO_2$ flow rates of the exhaust gas 11A measured by the flowmeter 101 are more than 90 and 100 or less as a flow rate range R11, a range where the $CO_2$ flow rates are more than 80 and 90 or less as a flow rate range R12, a range where the $CO_2$ flow rates are more than 70 and 80 or less as a flow rate range R13, a range where the $CO_2$ flow rates are more than 60 and 70 or less as a flow rate range R14, a range where the $CO_2$ flow rates are more than 50 and 60 or less as a flow rate range R15, a range where the $CO_2$ flow rates are more than 40 and 50 or less as a flow rate range R16, a range where the $CO_2$ flow rates are more than zero and 40 or less as a flow rate range R17 in advance.

Also, the control unit 102 adjusts the flow rate of the lean solution pump 54 and the opening degree of the adjusting valve 32 within a range of the set load values that are preset according to the flow rate ranges R11 to R17 classified into the seven stages, and controls the flow rate of the $CO_2$ absorbing liquid 13 supplied to the $CO_2$ absorption tower 14 and the flow rate of steam supplied to the $CO_2$ absorbing liquid regeneration tower 15. In addition, the set load values herein are, for example, the specific flow rates of the lean solution pump 54 and the specific opening degrees of the adjusting valve 32 that are preset according to the flow rate ranges R11 to R17.

In a case where the $CO_2$ flow rates are in the flow rate range R11, the control unit 102 adjusts the flow rate of the lean solution pump 54 and the opening degree of the adjusting valve 32 in a range where the preset load values are 6 or more and 7 or less, and controls the flow rate of the $CO_2$ absorbing liquid 13 supplied to the $CO_2$ absorption tower 14 and the flow rate of steam supplied to the $CO_2$ absorbing liquid regeneration tower 15. Similarly, in a case where the $CO_2$ flow rates are in the flow rate range R12, the control unit 102 adjusts the flow rate of the lean solution pump 54 and the opening degree of the adjusting valve 32 in a range where the preset load values are 5 or more and 6 or less.

Additionally, in a case where the $CO_2$ flow rates are in the flow rate range R13, the control unit 102 adjusts the flow rate of the lean solution pump 54 and the opening degree of the adjusting valve 32 so that the preset load value of the $CO_2$ recovery apparatus 2 is within a range of 4 or more and 5 or less. In a case where the $CO_2$ flow rates are in the flow rate range R14, the control unit 102 adjusts the flow rate of the lean solution pump 54 and the opening degree of the adjusting valve 32 in a range where the preset load values are 3 or more and 4 or less.

Moreover, in a case where the $CO_2$ flow rates are in the flow rate range R15, the control unit 102 adjusts the flow rate of the lean solution pump 54 and the opening degree of the adjusting valve 32 in a range where the preset load values are 2 or more and 3 or less. In a case where the $CO_2$ flow rates are in the flow rate range R16, the control unit 102 adjusts the flow rate of the lean solution pump 54 and the opening degree of the adjusting valve 32 in a range where the preset load values are 1 or more and 2 or less.

Additionally, in a case where the $CO_2$ flow rates are in the flow rate range R17, the control unit 102 adjusts the flow rate of the lean solution pump 54 and the opening degree of the adjusting valve 32 in a range where the preset load values are 0 or more and 1 or less. As the control unit 102 controls the operation condition of the $CO_2$ recovery apparatus 2 in this way, it is possible to appropriately control the operation conditions over variations of the actual $CO_2$ flow rates even in a case where the $CO_2$ flow rates vary on a small scale at any time within a range of the flow rate ranges R11 to R17. In addition, the control unit 102 may appropriately change the set load values to control operation according to elapsed time as long as the exhaust gas flow rate is within a range of the set load values corresponding to the range of the flow rate ranges R11 to R17.

Figure 8:
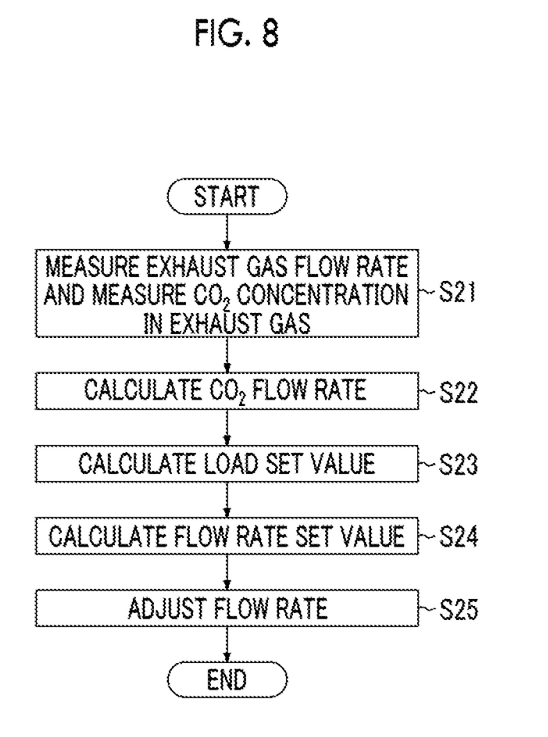
FIG. 8 is a flowchart of the operation control of the $CO_2$ recovery apparatus related to the second embodiment.

Next, the overall operation of the $CO_2$ recovery apparatus 2 related to the present embodiment will be described with reference to FIG. 8. FIG. 8 is a flowchart of the operation control of the $CO_2$ recovery apparatus 2 related to the present embodiment. As illustrated in FIG. 8, in the $CO_2$ recovery apparatus 2 related to the present embodiment, the flowmeter 101 measures the exhaust gas flow rates of the exhaust gas 11A introduced into the $CO_2$ absorption tower 14, and the $CO_2$ concentration meter 103 measures $CO_2$ concentration in the exhaust gas 11A (Step S21). Next, the control unit 102 obtains $CO_2$ flow rates per unit time, on the basis of the measured exhaust gas flow rates and $CO_2$ concentration of the exhaust gas 11A (Step S22). Next, the control unit 102 classifies the obtained $CO_2$ flow rates into preset flow rate ranges, and calculates set load values according to the classified flow rate ranges (Step S23). Then, the control unit 102 calculates the flow rate of the $CO_2$ absorbing liquid 13 supplied to the $CO_2$ absorption tower 14 and the flow rate of the steam S supplied to the $CO_2$ absorbing liquid regeneration tower 15 according to the set load values (Step S24), and adjusts the flow rate of the lean solution pump 54 and the opening degree of the adjusting valve 32 so that the calculated flow rates are obtained (Step S25).

As described above, according to the present embodiment, the control unit 102 performs operation control, on the basis of the $CO_2$ flow rates obtained by measuring the flow rates of the exhaust gas 11A and the $CO_2$ concentration in the exhaust gas 11A. Thus, the flow rate of the $CO_2$ absorbing liquid 13 supplied to the $CO_2$ absorption tower 14 and the flow rate of the steam S supplied to the $CO_2$ absorbing liquid regeneration tower 15 can be more precisely controlled.

REFERENCE SIGNS LIST 1, 2: $CO_2$ RECOVERY APPARATUS
11A, 11B, 11C, 11D: EXHAUST GAS
12: COOLING TOWER
121: COOLING SECTION
122: HEAT EXCHANGER
123: CIRCULATION PUMP
13: $CO_2$ ABSORBING LIQUID
14: $CO_2$ ABSORPTION TOWER
14a: TOWER TOP PART
14b: TOWER BOTTOM PART
141: $CO_2$ ABSORPTION SECTION
142: MAIN WASHING SECTION
143: PRELIMINARY WASHING SECTION
144: LIQUID STORAGE SECTION
145: CHIMNEY TRAY
146: MIST ELIMINATOR
15: $CO_2$ ABSORBING LIQUID REGENERATION TOWER
15a: TOWER TOP PART
151: $CO_2$ ABSORBING LIQUID SUPPLY SECTION
16: FLUE
21: HEAT EXCHANGER
22: CIRCULATION PUMP
23: ADJUSTING VALVE
24: HEAT EXCHANGER
31: REGENERATIVE HEATER
32: ADJUSTING VALVE
33: CIRCULATION PUMP
41, 44: $CO_2$ GAS
42: CONDENSER
43: SEPARATION DRUM
45: CONDENSED WATER CIRCULATION PUMP
50: RICH SOLUTION SUPPLY TUBE
51: RICH SOLVENT PUMP
52: RICH-LEAN SOLUTION HEAT EXCHANGER
53: LEAN SOLUTION SUPPLY TUBE
54: LEAN SOLUTION PUMP
55: COOLING SECTION
101: FLOWMETER
102: CONTROL UNIT
103: $CO_2$ CONCENTRATION METER
$L_1, L_2, L_4$: CIRCULATION LINE
$L_3$: EXTRACTION LINE
$L_5$: GAS EXHAUST LINE
$L_6$: CONDENSED WATER LINE
S: SATURATED STEAM
$W_1$: COOLING WATER
$W_2, W_3$: WASHING WATER
$W_4$: STEAM CONDENSED WATER
$W_5$: CONDENSED WATER

The invention claimed is:

1. A $CO_2$ recovery apparatus comprising:
a $CO_2$ absorption tower that brings a gas to be treated containing $CO_2$ into contact with a $CO_2$ absorbing liquid and makes the $CO_2$ absorbing liquid absorb $CO_2$ contained in the gas to be treated;
a $CO_2$ absorbing liquid regeneration tower that heats the $CO_2$ absorbing liquid, which has absorbed $CO_2$, with steam, releases $CO_2$ from the $CO_2$ absorbing liquid, and regenerates the $CO_2$ absorbing liquid;
a flow rate measuring unit that measures the flow rates of the gas to be treated that is introduced into the $CO_2$ absorption tower; and
a control unit that classifies the flow rates of the gas to be treated measured by the flow rate measuring unit into multiple flow rate ranges, and controls the flow rate of the $CO_2$ absorbing liquid supplied to the $CO_2$ absorption tower and the flow rate of steam supplied to the $CO_2$ absorbing liquid regeneration tower, on the basis of set load values that are preset according to the multiple flow rate range classifications,
wherein the control unit keeps the set load values substantially constant within the flow rate ranges and thereby controls the flow rate of the $CO_2$ absorbing liquid supplied to the $CO_2$ absorption tower and the flow rate of the steam supplied to the $CO_2$ absorbing liquid regeneration tower on the basis of the set load values that are present according to the respective flow rate range classifications.

2. The $CO_2$ recovery apparatus according to claim 1, wherein the control unit keeps the set load values substantially constant at maximum values corresponding to the flow rate ranges within the multiple flow rate ranges and thereby controls the flow rate of the $CO_2$ absorbing liquid supplied to the $CO_2$ absorption tower and the flow rate of the steam supplied to the $CO_2$ absorbing liquid regeneration tower.

3. The $CO_2$ recovery apparatus according to claim 1, wherein there are 7 or less classifications in the multiple flow rate ranges.

* * * * *